(12) United States Patent
Lenihan

(10) Patent No.: US 6,736,415 B1
(45) Date of Patent: May 18, 2004

(54) UNIVERSAL CART AND INTERCHANGEABLE ATTACHMENT SYSTEM

(76) Inventor: Gary G. Lenihan, 6535 Stow Rd., Hudson, OH (US) 44236

( * ) Notice: Subject to any disclaimer, the term of this patent is extended or adjusted under 35 U.S.C. 154(b) by 0 days.

(21) Appl. No.: 09/704,038

(22) Filed: Nov. 1, 2000

(51) Int. Cl.[7] ................................................. B62B 3/02
(52) U.S. Cl. ................................ 280/47.19; 280/47.35; 280/47.38; 446/471
(58) Field of Search ....................... 280/47.19, 47.35, 280/47.41, 47.38, 30, 33.992, 33.993, 33.997, 643; 446/6, 71, 75–77, 85, 88, 93, 94–96, 409, 463, 470, 431, 264, 451, 412, 471; 297/130, 256.16, 118, 134, 148; 296/180, 177

(56) References Cited

U.S. PATENT DOCUMENTS

| | | | |
|---|---|---|---|
| 1,396,039 A | | 11/1921 | Halm |
| 2,382,982 A | | 8/1945 | Elliott .............................. 46/16 |
| 2,605,812 A | | 8/1952 | Benze ........................... 155/41 |
| 3,528,193 A | | 9/1970 | Yamakawa ...................... 46/17 |
| 3,939,600 A | | 2/1976 | Eld ................................. 46/17 |
| 3,982,352 A | | 9/1976 | Branson ........................... 46/17 |
| 4,265,461 A | | 5/1981 | Okubo ......................... 280/1.13 |
| 4,664,396 A | * | 5/1987 | Pietrafesa ...................... 280/30 |
| D305,675 S | * | 1/1990 | Kolker ........................ D21/134 |
| 4,958,842 A | | 9/1990 | Chang .......................... 280/7.1 |
| 4,984,813 A | | 1/1991 | Takahashi et al. .............. 280/30 |
| 4,993,983 A | | 2/1991 | Kurita et al. ................... 446/94 |
| 5,104,134 A | | 4/1992 | Cone .............................. 280/30 |
| 5,106,150 A | | 4/1992 | Litwicki ....................... 296/216 |
| 5,125,712 A | * | 6/1992 | Stamoutsos ................. 296/77.1 |
| 5,265,892 A | | 11/1993 | Said .............................. 280/30 |
| 5,265,912 A | | 11/1993 | Natividad .................... 280/828 |
| D353,566 S | * | 12/1994 | Chow et al. ................ D12/130 |
| D361,418 S | | 8/1995 | Smith .......................... D34/19 |
| 5,441,289 A | * | 8/1995 | Spielberger ............. 280/87.051 |
| 5,447,354 A | | 9/1995 | Delp ........................... 296/104 |
| 5,460,391 A | | 10/1995 | Gantz et al. ................... 280/30 |
| 5,474,483 A | | 12/1995 | Sun .............................. 446/71 |
| 5,538,267 A | | 7/1996 | Pasin et al. ............... 280/87.01 |
| 5,704,625 A | * | 1/1998 | Presnell et al. ............. 280/79.2 |
| 5,772,222 A | | 6/1998 | Sim et al. ...................... 280/30 |
| 5,788,253 A | * | 8/1998 | Thomson et al. ....... 280/87.041 |
| 5,857,695 A | | 1/1999 | Crowell ....................... 280/651 |
| 5,893,606 A | | 4/1999 | Chiang ....................... 297/118 |
| 6,176,759 B1 | * | 1/2001 | Trageser ...................... 446/272 |
| 6,206,384 B1 | * | 3/2001 | Chi et al. ...................... 280/30 |
| D443,233 S | * | 6/2001 | Gaudet et al. ............. D12/130 |
| 6,250,652 B1 | * | 6/2001 | Nelson ..................... 280/47.38 |

* cited by examiner

Primary Examiner—Brian L. Johnson
Assistant Examiner—J. Allen Shriver

(57) ABSTRACT

A portable toy including a toy push cart frame and one toy attachment. The frame includes a base portion of a predetermined width and at least one projection upwardly extending from the base portion. The projection has a height which is greater than the width of the base portion. The frame interchangeably supports and is removeably coupled to one of a plurality of toy attachments. A toy utilitarian attachment includes a toy body configured for removable and interchangeable attachment to the universal push cart frame. The body is substantially suspended from the base portion of the body, the body formed as one of a shop cart basket, a doll stroller seat, a tool box, a work bench, a refuse container, a garden equipment container; a serving bin and a toddler activity center. A universal push cart system includes a push cart frame and at least two interchangeable attachments or bodies. An injection molded wheel and hub assembly for a toy vehicle. The wheel and hub assembly includes first and second disks. The first disk has a hub opening. The second disk is coupled to the first disk to form the wheel and hub assembly. The second disk has an axial projection for engaging the hub opening. The axial projection includes an axle receiving opening.

21 Claims, 10 Drawing Sheets

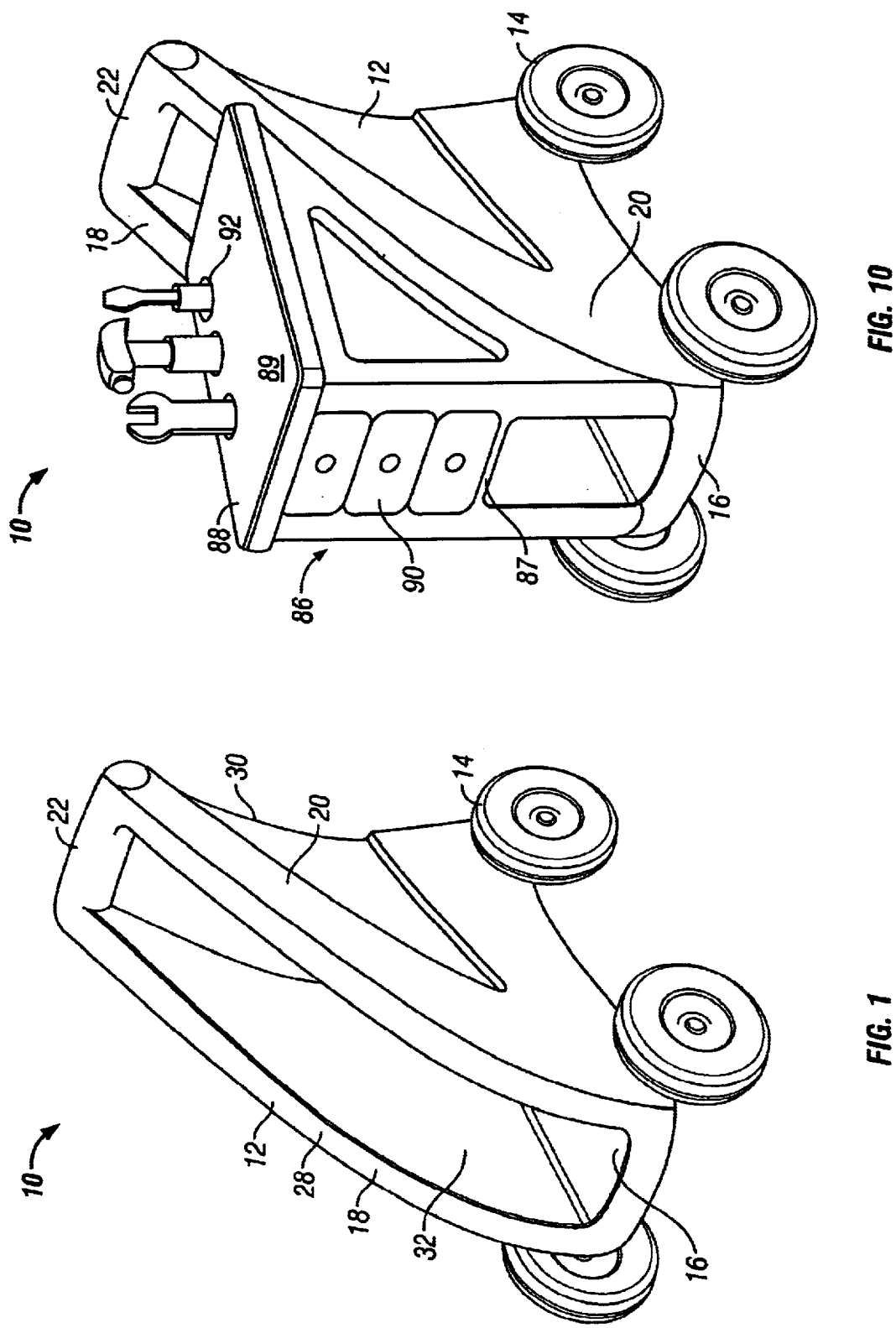

UNIVERSAL CART AND INTERCHANGEABLE ATTACHMENT SYSTEM

FIELD OF THE INVENTION

The present invention relates generally to a universal or general purpose cart system and, in particular to a universal toy cart and a plurality of interchangeable attachments.

BACKGROUND OF THE INVENTION

Push carts are well known for providing effective means of transporting persons or objects of all types. Push carts are employed in numerous applications including, but not limited to, shopping carts, strollers, tool carts, garden carts, childrens' walkers, utility carts, refuse carts and food service carts. Children enjoy using carts to imitate various activities encountered in everyday life (e.g., grocery shopping with a shopping cart or imitating walking a baby with a doll stroller). Toy carts help to provide a child with a sense of control and ownership. Carts, particularly toy carts, are typically designed to perform a specific function. Such carts include a frame and an attachment integrally formed or fixed to the frame.

Such carts however have a number of drawbacks. Typically, each separate cart has a different design and configuration. Due to the single purpose or single function design of most carts, it is not uncommon for a user to have to obtain multiple carts to perform different tasks. The need for an additional cart typically arises because the user has outgrown, or otherwise no longer requires, the function provided by original cart. Also, carts typically are quite large, making storage and transportation difficult. Moreover, due to their size, carts can also be expensive, with a large portion of the cost of a cart being attributable to material and transportation costs.

Thus, there is a continuing need for a single cart structure which can accommodate multiple functions with a minimal amount of modification. What is needed is a multi-functional cart system which can adapt to the varied needs of the user thereby eliminating the need to obtain several different separate carts. It would be advantageous to provide a cart system which is easier to store, easier to transport and cheaper to produce. What is needed is a cart system which maximizes the usefulness of a cart, while reducing the costs and the material waste associated with the manufacturing of the cart.

SUMMARY OF THE INVENTION

The present invention provides a portable toy including a toy push cart frame and one toy attachment. The frame includes a base portion of a predetermined width and at least one projection upwardly extending from the base portion. The projection has a height which is preferably greater than the width of the base portion. The frame interchangeably supports and is removeably coupled to one of a plurality of toy attachments.

The present invention also provides a utilitarian attachment for a toy push cart system. The system includes a frame having a generally flat base portion and at least one support member upwardly extending from the base. The attachment includes a toy body configured for removable and interchangeable attachment to the universal push cart frame. The body is substantially suspended from the base portion of the body, and the body is formed as one of a shop cart basket, a doll stroller seat, a tool box, a work bench, a refuse container, a garden equipment container, a serving bin and an activity center.

The present invention also provides a universal push cart system including a push cart frame and at least two bodies. One of the bodies is selectably and interchangeably attached to the frame. The bodies are selected from the group consisting of a shop cart basket, a doll stroller seat, a tool box, a work bench, a refuse container, a garden equipment container, a serving bin, a toddler activity center and combinations thereof.

The present invention also provides an injection molded wheel and hub assembly for a toy vehicle. The wheel and hub assembly includes first and second disks. The first disk has a hub opening, and the second disk is coupled to the first disk to form the wheel and hub assembly. The second disk has an axial projection for engaging the hub opening. The axial projection includes an axle receiving opening.

This invention will become more fully understood from the following detailed description, taken in conjunction with the accompanying drawings described hereinbelow and wherein like reference numerals refer to like parts throughout the several drawings.

BRIEF DESCRIPTION OF THE DRAWINGS

FIG. 1 is a front perspective view of a universal cart in accordance with an embodiment of the invention;

FIG. 10 is a side perspective view of the cart of FIG. 1 with a tool box and work bench attachment;

DETAILED DESCRIPTION OF THE PREFERRED EMBODIMENTS

FIG. 1 is a front perspective view of a cart 10 for a universal cart system having a plurality of interchangeable attachments. The cart 10 is a portable multifunctional carrier configured to interchangeably and selectably support a plurality of different attachments, preferably utilitarian or functional attachments which will be described hereinafter. (See, for example, FIGS. 4 through 10). The cart 10 includes a frame 12 and a set of wheels 14.

The frame 12 is a versatile, streamlined support structure which is coupled to the wheels 14 and is removably and selectably coupled to at least one of the attachments. The frame 12 interchangeably supports a variety of different attachments eliminating the need to develop or obtain one or more additional carts to perform one or more additional functions. The frame 12 is preferably formed as a single molded article, but alternatively the frame 12 can be made of two or more assembled components. The frame 12 is made of a durable, lightweight and inexpensive material. The frame 12 is preferably made of rotationally molded plastic and, alternatively, can be made of other materials, such as, for example, other plastics, sheet metal, wood or ceramics. The frame 12 can also be produced in a variety of colors or color combinations. In a particularly preferred embodiment, the frame 12 has a length of approximately fourteen inches, a width of nine inches and a height of approximately twenty-two inches. Other frame dimensions are contemplated.

Figure 3:
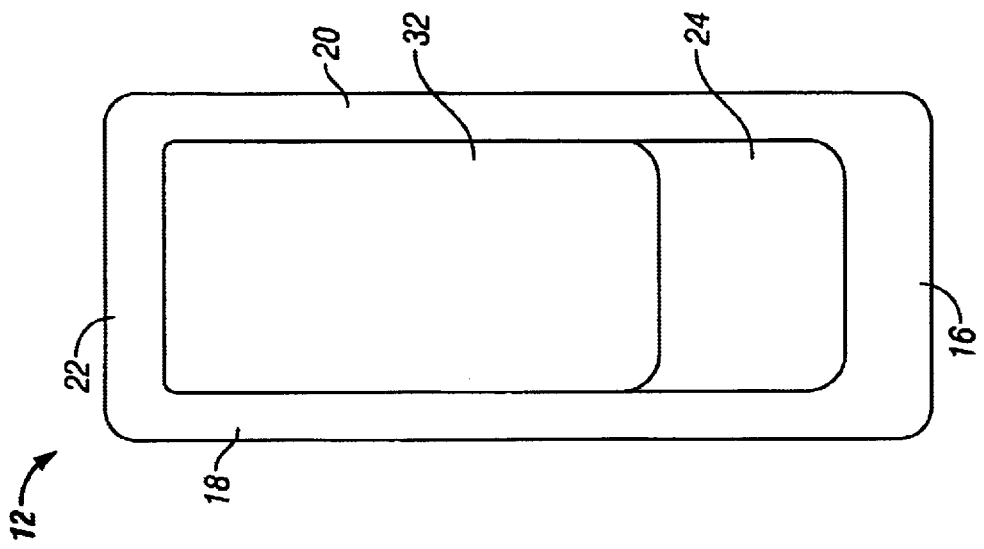
FIG. 3 is a front view of the frame of FIG. 1.
Figure 2:
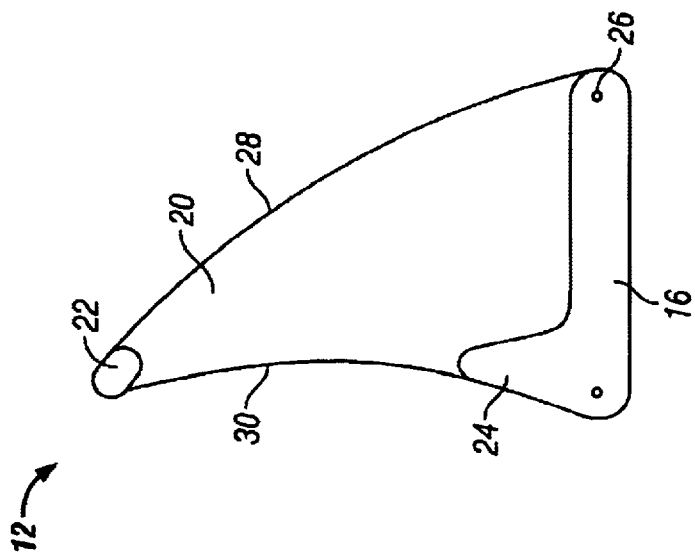
FIG. 2 is a cross-sectional view of the frame of the cart of FIG. 1 taken along a plane longitudinally extending through the center of the cart.

Referring to FIGS. 1 through 3, the frame 12 includes a base portion 16, first and second opposing and spaced apart side walls 18 and 20 and a cross bar 22. Referring to FIGS. 1 and 2, the base portion 16 is a generally flat member having a rear projection 24 upwardly extending from the rear of the base portion 16 and between the first and second side walls 18 and 20. The projection 24 provides additional strength and stability to the frame 12. Referring to FIG. 2, a set of holes 26 are defined within the base portion 16 for supporting the wheels 14. The base portion 16 is integrally connected to, and supports, the first and second side walls 18 and 20.

Referring to FIGS. 1 through 3, the side walls 18 and 20 each include an upper and lower end. Each side wall 18 and 20 upwardly extends at its the lower end from the base portion 16 and connects at its upper end to the crossbar 22. The side walls 18 and 20 support and substantially suspend one of the attachments above the base portion 16. Each side wall 18 and 20 has a forward surface 28 and a rear surface 30. In a preferred embodiment, the front surface 28 of each side wall 18 and 20 has an arcuate profile which extends upwardly and rearwardly from the base portion 16 toward the crossbar 22. The rear surface 30 also has an arcuate profile which upwardly and forwardly extends from the base portion 16 and then upwardly and rearwardly extends to connect with the crossbar 22. In a particularly preferred embodiment, the forward surface 28 has a radius of approximately thirty-eight inches and the rear surface 30 has a radius of approximately twenty-seven inches. Further, each side wall 18 and 20 has a most preferred width of approximately one and a quarter inches.

The crossbar 22 is a rod which is coupled to the first and second side walls 18 and 20. In a preferred embodiment, the crossbar 22 is integrally formed to the frame 12. The crossbar 22 provides additional support and stability to the frame 12 and, preferably, serves as a handle for grasping by a user, such as a child. The crossbar 22 is also preferably ergonomically positioned at an upper rear portion of the frame 12. The crossbar 22 can also include a hand grip or gripping cover (not shown). In alternative preferred embodiments, the crossbar 22 can be shaped to provide alternate hand grip positions for the user. In one alternative embodiment, at least one crossbar extension can be attached to, and can extend from, the crossbar 22 to provide additional gripping positions for the cart 10.

The base portion 16, the first and second side walls 18 and 20 and the crossbar 22 of the frame 12 define an attachment receiving region 32 for at least partially receiving an attachment. The spaced apart configuration and the arcuate shape of the side walls 18 and 20 of the frame 12 enable the frame 12 to be easily accessed from a forward direction or from above. The arcuate shape and spaced apart configuration provides for continuous horizontal or vertical access to the attachment receiving region 32 of the frame 12. Moreover, the configuration of the side walls facilitates the connection, including the suspended connection, of attachments to the frame 12 and access to the installed attachments. The configuration of the frame 12, including the attachment receiving region 32, also reduces the amount of material required for frame production. The reduced frame material requirements contribute to lower production cost for the frame 12. While FIGS. 1 through 3 disclose one preferred embodiment of the frame 12, alternative frame configurations can also be used, such as for example, a single upstanding projection extending from a base portion, or a base portion having one or more attachment receiving openings.

Referring to FIG. 1, the wheels 14 are rotatably coupled to the frame 12. In a preferred embodiment, the cart 10 includes four wheels 14 rotatably coupled to the frame 12 through two axles 34 (see FIG. 6). In an alternative preferred embodiment, the cart 10 can include two wheels 14 and a footing (not shown). The wheels 12 provide a means for easily moving the cart 10 from one location to another.

Figure 4:
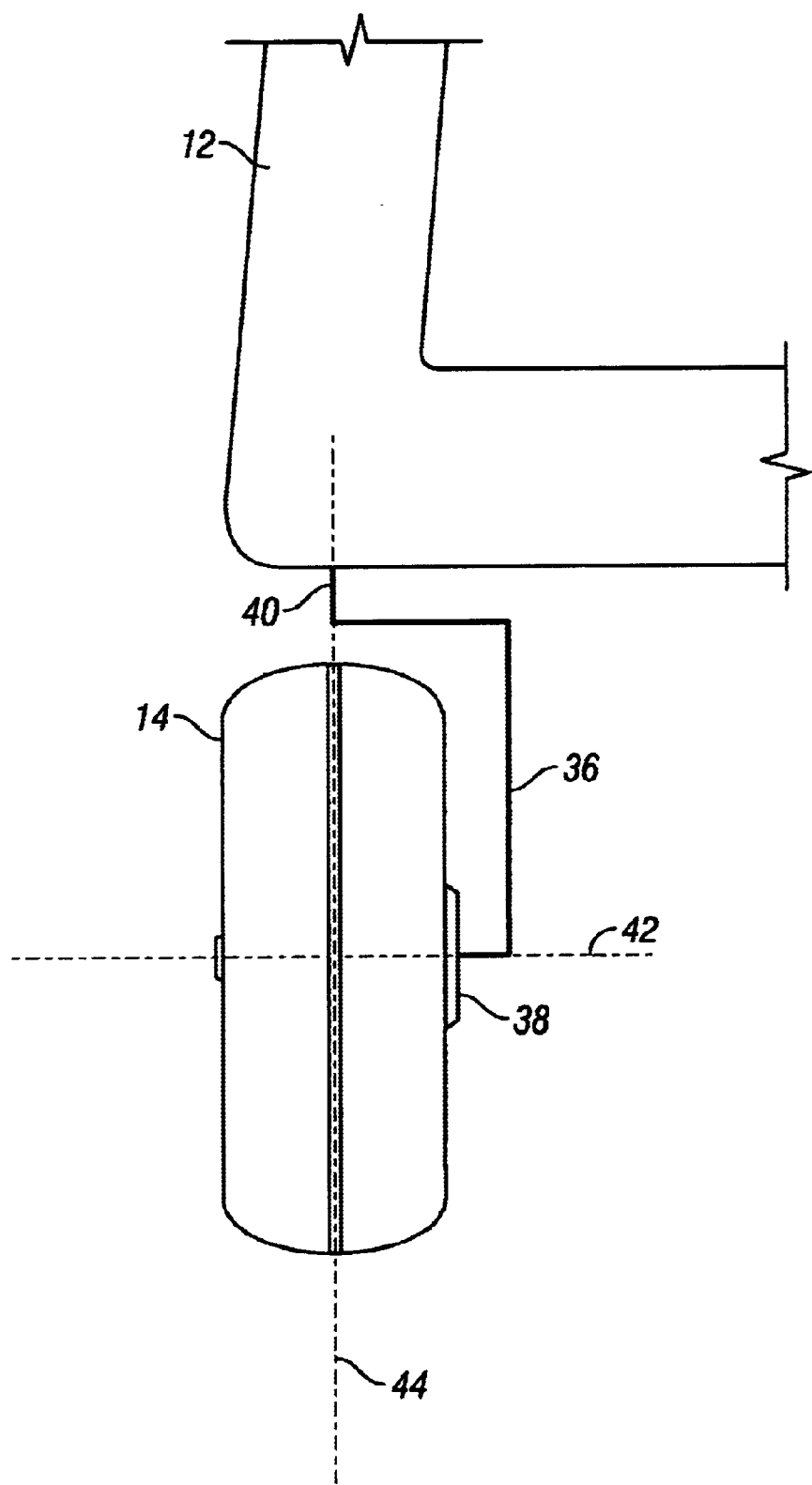
FIG. 4 is a front sectional view of a portion of a cart constructed in accordance with an alternative embodiment of the present invention.

In another alternative preferred embodiment, at least two of the four wheels 14 are coupled to the frame 12 in a manner which enables the wheels 14 to rotate and pivot with respect to the frame 12. As shown in FIG. 4, the wheels 14 can be coupled to a bent axle 36 having a first end 38 and a second end 40. The first end 38 of the bent axle 36 is rotatably coupled to the wheels 14 and the second end 40 of the bent axle 36 is rotatably coupled to an underside of the frame 12. Use of the bent axle 36 enables the wheels 14 to rotate about a first axis 42 extending through the first end 38 of the bent axle 36, and the second end 40 of the bent axle 36 itself to rotate about a second axis 44 extending through the second end 40 of the bent axle 36. Other configurations for obtaining rotation about two non-parallel axes can also be used. In another alternative exemplary embodiment, a locking device (not shown) can be coupled to one or more of the wheels 14, or to an axle, to prevent the cart 10 from rolling.

Figure 5:
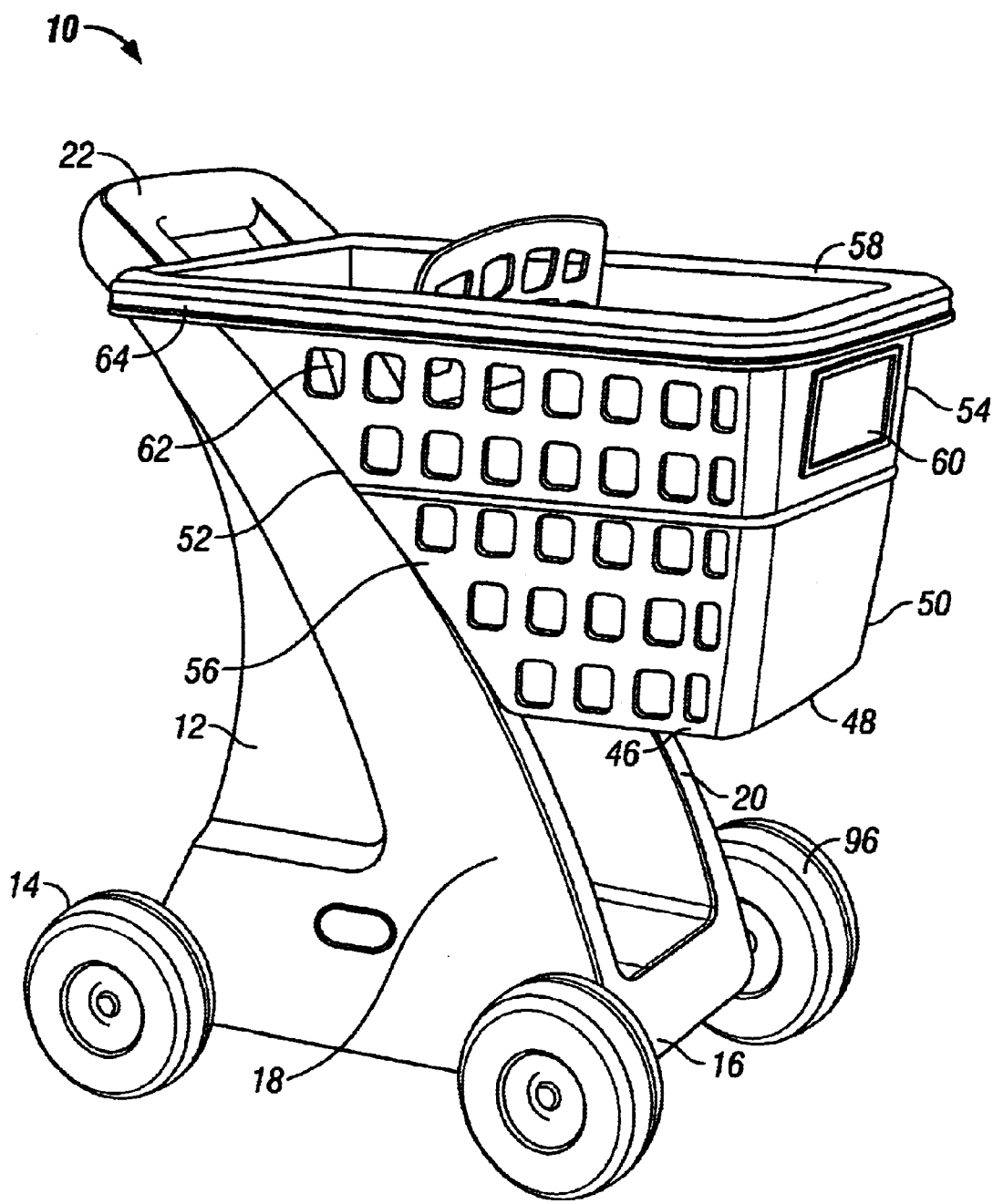
FIG. 5 is a side perspective view of the cart of FIG. 1 with a shopping cart attachment.
Figure 7:
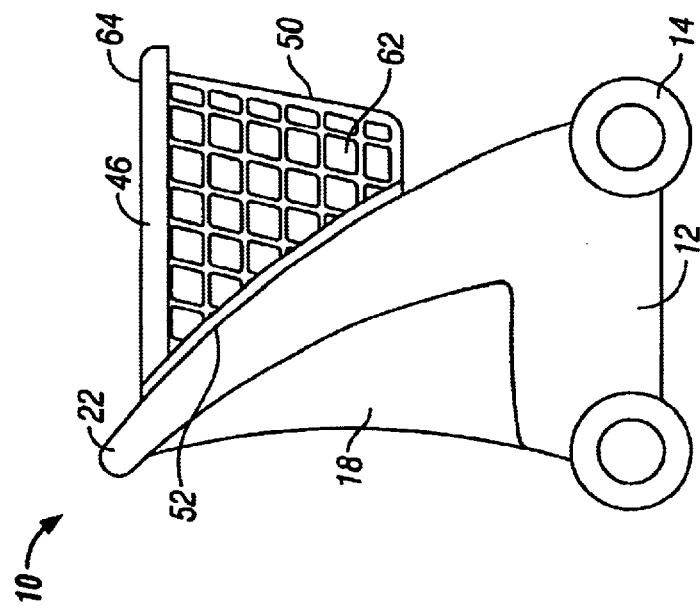
FIG. 7 is a side view of the cart of FIG. 5.
Figure 6:
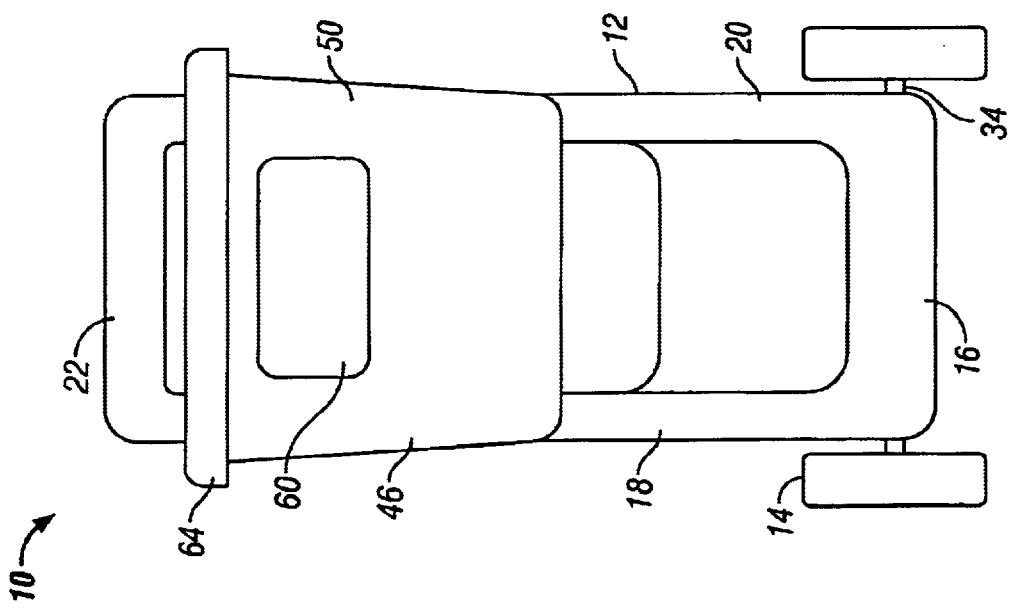
FIG. 6 is a front view of the cart of FIG. 5.

FIGS. 5 through 7 illustrate one preferred embodiment of the cart 10 including an attachment. In FIGS. 5 through 7, the attachment is a shopping cart basket 46, which can also be referred to as a grocery cart basket. The shopping cart basket 46 is an open top, box-like container. The shopping cart basket 46 is removably coupled to, and suspended from, the frame 12 at the forward surfaces 28 of the first and second side walls 18 and 20, respectively. The shopping cart basket 46 forwardly extends from the frame 12 and is configured to resemble a conventional shopping or grocery cart. The shopping cart basket 46 is also configured to hold a variety of real or toy grocery or department store items, such as, for example, food items, household products, cosmetics and dolls. In a particularly preferred embodiment, the shopping cart basket 46 has a depth of approximately 10 inches.

The shopping cart basket 46 includes a generally rectangular lower surface 48, a front wall 50, a rear wall 52, and opposing left and right side walls 54 and 56. The front, rear, left and right walls 50, 52, 54 and 56, respectively, are integrally connected and upwardly extend from the lower surface 48 to define a shopping cart basket cavity 58 for holding a variety items such as described above. The front wall 50 extends upwardly and substantially vertically from the lower surface 48. In a preferred embodiment, the front wall 50 is absent openings and has a label mounting portion 60. The rear wall 52 preferably has an arcuate profile which extends upwardly and rearwardly from the lower surface 48 to matably engage the forward surfaces 28 of the first and second side walls 18 and 20 of the frame 12, respectively.

The left and right side walls 54 and 56 upwardly extend from the lower surface 48. In a preferred embodiment, each side wall 54 and 56 includes a plurality of openings 62 providing the shopping cart basket 46 with an open lattice appearance resembling a conventional shopping or grocery basket. In an alternative preferred embodiment, each surface of the shopping cart basket 46 can include the openings 62.

The shopping cart basket 46 further includes an upper rim 64 and a seat member 66 (see FIG. 6). The upper edges of the front, rear, left and right walls 50, 52, 54 and 56 are curved outwardly and downwardly to form an upper rim 64. The upper rim 64 strengthens, and facilitates grasping of, the shopping cart basket 46. The seat member 66 is coupled to the shopping cart basket 46 at the rear wall within the shopping cart basket cavity 58. The seat member 66 is configured to support a doll or other items and to resemble a conventional shopping or grocery cart child seat.

Figure 8:
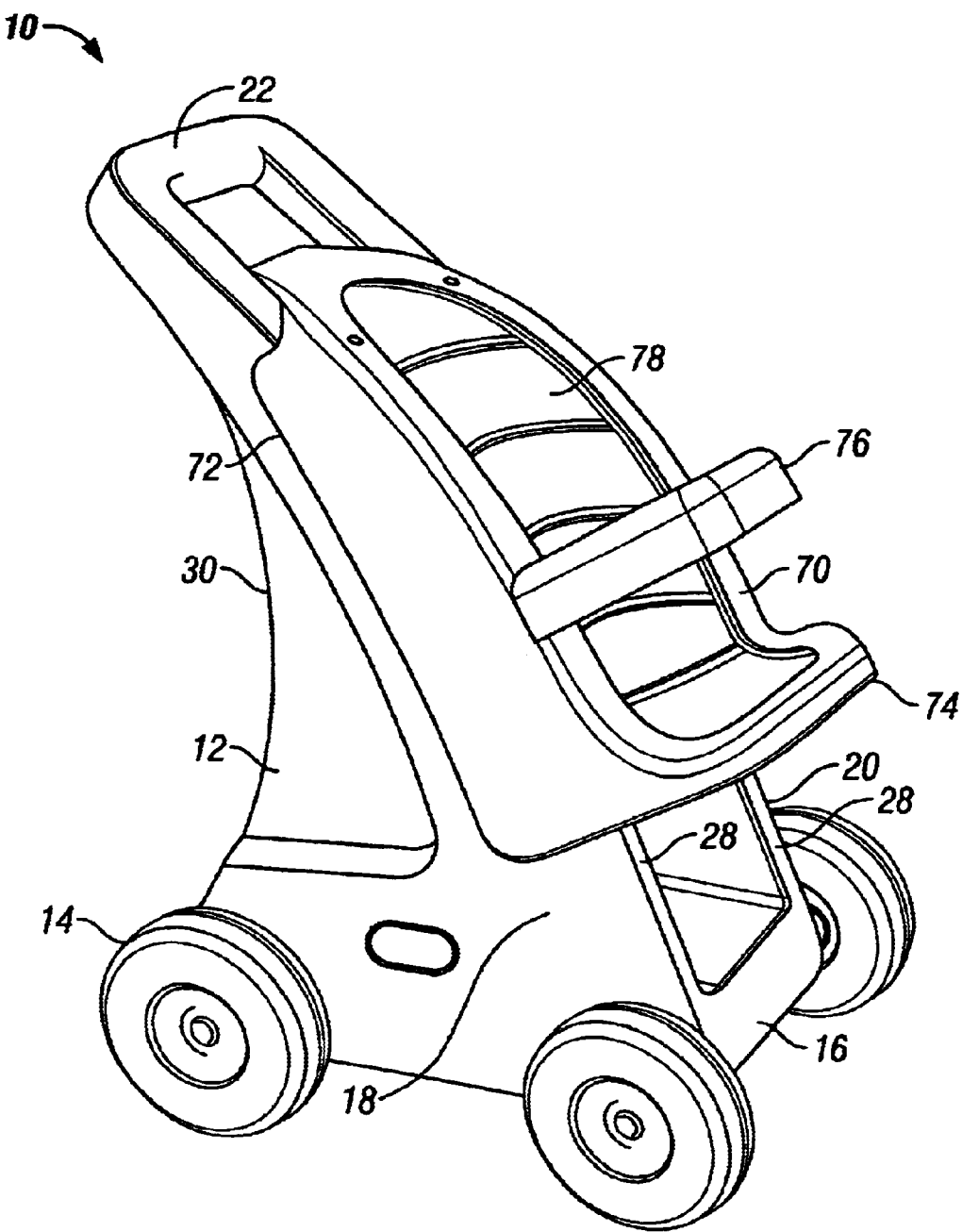
FIG. 8 is a side perspective view of the cart of FIG. 1 with a stroller seat attachment.

FIG. 8 illustrates another preferred embodiment of the cart 10 including an attachment, which is a stroller seat 70. The stroller seat 70 is a generally L-shaped structure which is removably connected to the frame 12 at the forward surfaces 28 of the left and right walls 18 and 20, respectively. The stroller seat 70 is preferably suspended above the base portion 16 of the frame 12. The stroller seat 70 is configured to support a toy, such as, for example, a doll, a figurine or a stuffed character. The stroller seat 70 enables a user, such as a child, to place an item in the stroller seat 70 and to push or pull the cart 10 from one location to another. In an alternative embodiment, the stroller seat 70 can be configured to support a small child.

The stroller seat 70 includes a seat back portion 72, a seat bottom 74 and a retaining bar 76. The seat back portion 72 removably attaches to the first and second side walls 18 and 20 of the frame 12. A contoured recess 78 is defined within a forward surface of the seat back portion 72 for supporting a toy object. The seat bottom portion 74 forwardly extends from a lower end of the seat back portion 72 and is configured to inhibit a toy object from falling out of the stroller seat 70. The retaining bar 76 is connected to the forward surface of the seat back portion 72 in two locations and extends across the contoured recess 78. In alternative preferred embodiments different stroller seat configurations can be employed.

Figure 9:
FIG. 9 is a side perspective view of the cart of FIG. 1 with first and second garden cart container attachments.

FIG. 9 illustrates another preferred embodiment of the cart 10 including two attachments. The attachments are first and second garden cart containers 80 and 82. The garden cart containers 80 and 82 are storage bins removably coupled to the frame 12 at the side walls 18 and 20. In a preferred embodiment, the first garden cart container 80 is removably coupled to the first and second sides 18 and 20 at the forward end of the base portion 16, and the second garden cart container 82 is removably coupled to the first and second sides 18 and 20 at a position above the first garden cart container 80. Each garden cart container 80 and 82 forwardly projects from the frame 12 and preferably has generally triangular shaped side walls and arcuate rear walls for matably engaging the forward surfaces of the first and second side walls 18 and 20 of the frame 12. The first garden cart container 80 is preferably sized larger than the second garden cart container 82. The garden cart containers 80 and 82 are configured for holding garden related items, such as, for example, garden tools, toy garden tools, leaves, dirt, or stone. One or more of the garden cart containers can also be used to as to hold refuse, toys, beach supplies, or other items.

FIG. 10 illustrates another preferred embodiment of the cart 10 including an attachment which is a tool box 86. The tool box 86 is a multi-compartment storage apparatus including a work bench 88. A rear surface of the tool box 86 has an arcuate shape for matably engaging the forward surfaces 28 (see FIG. 1) of the first and second side walls 18 and 20 of the frame 12, respectively. The tool box 86 is removably coupled to the frame 12 (see FIG. 10). The tool box 86 is configured to hold a variety of different sized real or toy tools and equipment. The tool box 86 further includes a tool box frame 87 for supporting a set of drawers 90 and a top surface 89 forms the work bench 88. The work bench 88 preferably includes a set of tool compartments 92 for holding tools in an upstanding position. In an alternative embodiment, the tool box 86 can be configured with: a different number of drawers; without drawers; or without a work bench 88. In an alternative embodiment, the tool box 86 can be configured as a serving or entertaining cart for holding toy or actual food stuffs, utensils and dishware.

Figure 11:
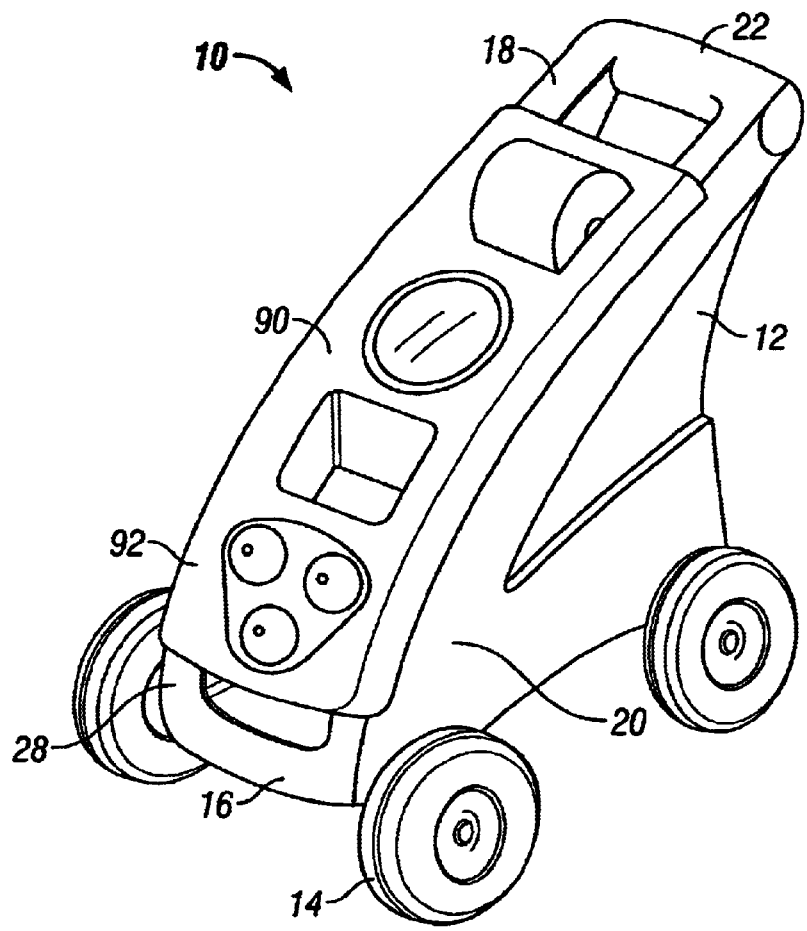
FIG. 11 is a front perspective view of the cart of FIG. 1 with an activity center attachment.
Figure 12:
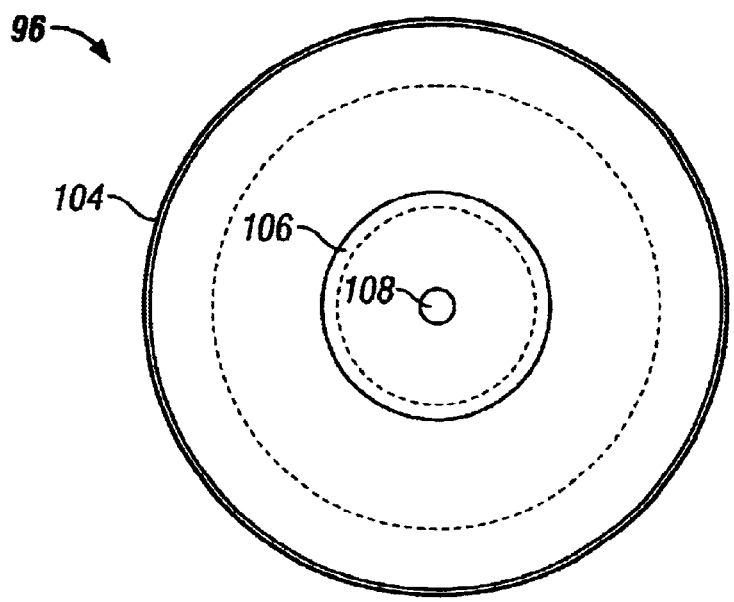
FIG. 12 is a side view of a two-piece wheel and built-in hub assembly constructed in accordance with a preferred component of the present invention.
Figure 13:
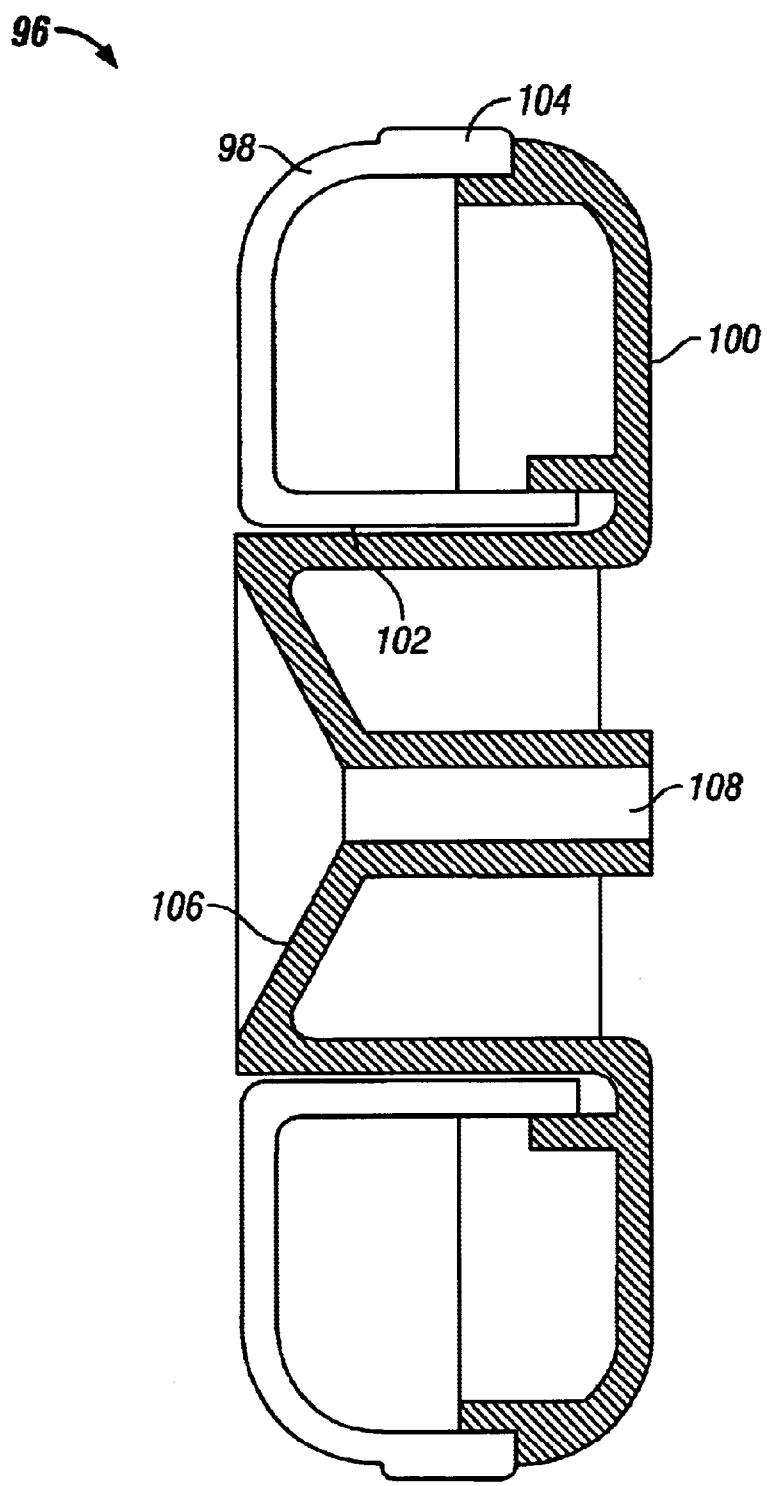
FIG. 13 is a cross sectional view of the two-piece wheel and hub assembly taken along line 13—13 of FIG. 12.
Figure 14:
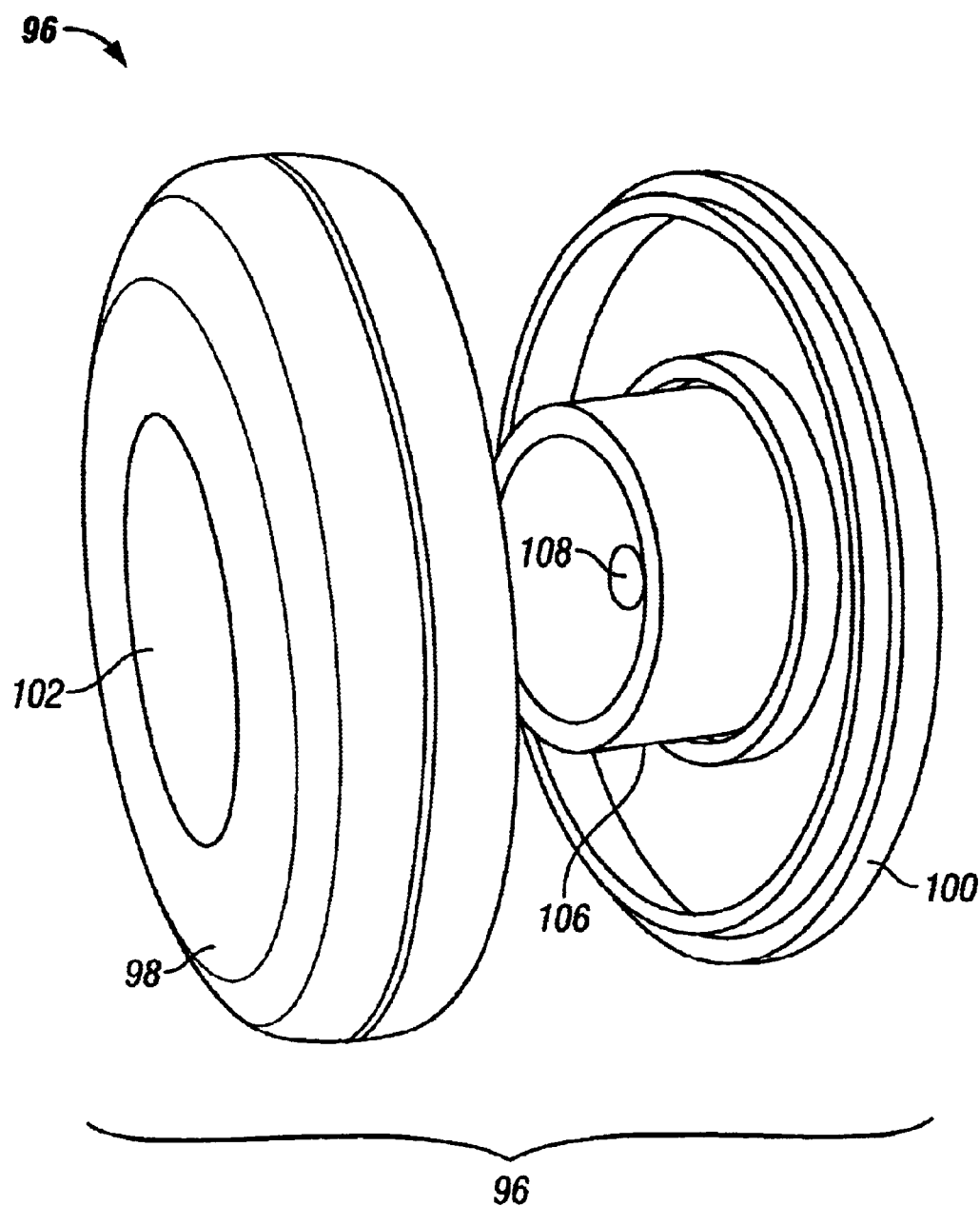
FIG. 14 is an exploded perspective view of the two-piece wheel and hub assembly of FIG. 12.

FIG. 11 illustrates another preferred embodiment of the cart 10 including an attachment which is a child's activity center 90 removably coupled to the frame 12 at the first and second side walls 18 and 20. In a preferred embodiment, the activity center 92 has a generally arcuate profile for engaging the forward surfaces 28 (see FIG. 1) of the first and second side walls 18 and 20 of the frame 12. The cart 10 with the activity center 90 serves as a walker and a play center for a small child. The activity center 90 includes a forward surface 92 having a combination of conventional activity center devices such as, for example, rolling cylinders or balls, mirrors, pushbuttons, lights, shape sorting devices, or bells.

The attachments illustrated on FIGS. 5, 8, 9, 10 and 11, including the shopping cart basket 46, the stroller seat 70, the garden cart containers 80 and 82, the tool box 86, the work bench 88, and the toy activity center 90, are preferably formed as a single molded article. Alternatively, each attachment can be made of two or more assembled components. Each attachment is made of a durable, lightweight and inexpensive material and is preferably made of molded plastic. Alternatively, the attachment can be made of other materials, such as, for example, other plastics, sheet metal, wood or ceramics. The attachments can also be produced in a variety of colors or color combinations.

The universal cart and interchangeable attachment system enables a single cart 10 to be used to perform a variety of different functions, thereby advantageously eliminating the need for additional carts. The universal cart system reduces the overall development and manufacturing costs of the cart 10 and the attachments by eliminating the need to design, tool and fabricate a separate cart frame and wheels for each function performed by an attachment. The interchangeability of the cart frame 12 and wheels 14 also enables a cart producer to more quickly and cost effectively produce a specific cart. Each attachment can be either produced and sold with a specific cart, or produced and sold separately from the cart, thereby reducing the overall production and transportation costs for the end product cart. The universal cart system can increase the useful product life of the cart and reduce waste by allowing for a single cart frame to be used with different attachments to satisfy a user's current needs or to match a child's specific age group. For example, the single cart can be initially used in conjunction with an activity center as a walker for a small child. As the child grows, the same cart can be used as the shopping cart or as the doll stroller. The same cart can later be used as the tool box, the garden cart or the entertainment center.

The versatility and interchangeability of the cart system further enables a consumer to purchase a single cart with multiple attachments thereby effectively obtaining multiple different cart toys. Moreover, the universal cart system takes up less space and is easier to store within a household. Additionally, the universal cart system enables each cart 10 to be produced in two or more pieces as opposed to a single piece. The multi-piece configuration enables the product to be transported in a smaller container thereby further reducing transportation costs.

FIGS. 5 and 12 through 14 illustrate a preferred embodiment for the wheels 14 of the cart 10. In a preferred embodiment, each of the wheels 14 is a two-piece wheel and built-in hub assembly 96. The two-piece wheel and built-in hub assembly 96 includes an outer wheel portion 98 and an inner wheel portion 100. The outer and inner wheel portions 98 and 100 are fixedly coupled to one another. In a preferred embodiment, the outer and inner wheels 98 and 100 are also snap fit together. Alternatively, other fastening methods can be used, such as for example, adhesives or fasteners. The outer and inner wheel portions 98 and 100 are made of a durable, lightweight and inexpensive material. The outer and inner wheel portions 98 and 100 are most preferably made of injection molded plastic and, alternatively, can be made of other materials, such as, for example, other plastics, rubber, metal, wood or ceramics. In a particularly preferred embodiment, the two-piece wheel and built-in hub assembly 96 has a diameter of approximately four and one-half inches.

The outer wheel portion 98 is an annular structure defining a hub receiving opening 102. The outer wheel portion 98 includes an outer circumferential edge 104 which serves as a primary riding contact surface for the two piece wheel 96. The inner wheel portion 100 is a disk having a cylindrical projection 106 outwardly axially extending from the center of the inner wheel portion 100. The cylindrical projection 106 of inner wheel portion 100 forms a hub shape having an axle opening 108 axially extending through the center of inner wheel portion 100 for receiving, and connecting to, the axle of the cart 10.

The two-piece construction of the two-piece wheel and built-in hub assembly 96 enables each of the outer and inner wheel portions 98 and 100 to be injection molded in a conventional two-piece mold. The two-piece injection molding process is more efficient and less labor intensive than other conventional wheel and hub manufacturing methods.

While preferred embodiments of the present invention have been described and illustrated, numerous departures therefrom can be contemplated by persons skilled in the art, for example, the cart can be configured to be collapsible. Additionally, the cart can be sized to accommodate adult use. Therefore, the present invention is not limited to the foregoing description but only by the scope and spirit of the appended claims.

What is claimed is:

1. A portable toy, comprising:
a toy cart frame including a base portion having a width and at least one arcuate shaped projection upwardly extending from the base portion, the projection having a height which is greater than the width of the base portion, the projection having an arcuate front surface, the frame interchangeably supporting one of a plurality of toy attachments,
one of the toy attachments removably coupled to the frame, the toy attachment having at least one arcuate shaped receiving surface for matingly engaging said respective arcuate front surface such that the toy attachment projects outwards from the arcuate front surface of the cart.

2. The portable toy of claim 1 wherein the toy attachment is selected from the group consisting of a shopping cart basket, a doll stroller seat, a tool box, a work bench, a refuse container, a garden equipment container; a serving bin and an activity center.

3. The portable toy of claim 1 further comprising at least two wheels coupled to the frame.

4. The portable toy of claim 1 further comprising four wheels.

5. The portable toy of claim 4, wherein at least two of the four wheels are mounted to the frame so as to enable the wheels to rotate about at least two non-parallel axes.

6. The portable toy of claim 1, further comprising a push member coupled to the frame.

7. The portable toy of claim 1 wherein the push member is integrally formed with the frame.

8. The portable toy of claim 6, wherein the push member is an ergonomically positioned handle.

9. The portable toy of claim 1 wherein the at least one projection includes first and second spaced apart side walls upwardly extending from the base portion.

10. The portable toy of claim 9 wherein the base portion, the first and second side walls, and a handle portion define an attachment receiving region.

11. The portable toy of claim 9, wherein each side wall includes arcuate front and rear surfaces.

12. A toy utilitarian attachment for a toy universal push cart system, the system including a frame having a generally flat base portion and at least one arcuate shaped support member upwardly extending from the base, the support member having an arcuate front surface, the attachment comprising:
a toy body configured for removable and interchangeable attachment to the universal push cart frame, the body substantially suspended from the base portion of the frame, the toy body includes a respective arcuate shaped receiving surface for matingly engaging one of the arcuate front surfaces such that the toy body projects outwardly from the arcuate front surface of the push cart frame, the body formed as at least one of a cart basket, a doll stroller seat, a tool box, a work bench, a refuse container, a garden equipment container, a serving bin and an activity center.

13. The toy utilitarian attachment of claim 12 wherein the at least one support member includes two side walls upwardly extending from the base portion and a handle member connecting the two side walls, wherein the base portion, the two side walls and the handle member define a body receiving region.

14. A universal cart system comprising:
a cart frame including at least one upstanding member having at least one of an arcuate front surface and rear surface; and
at least two different utilitarian bodies, each utilitarian body includes a respective arcuate shaped receiving surface for matingly engaging one of the arcuate front surfaces enabling the bodies to project outwards from the arcuate front surface of the cart, one of the bodies selectably and interchangeably attached to the frame, the bodies being selected from the group consisting of a shop car basket, a doll stroller seat, a tool box, a work bench, a refuse container, a garden equipment container, a serving bin, a toddler activity center and combinations thereof.

15. The push cart system of claim 14 further comprising at least two wheels coupled to the frame.

16. The push cart system of claim 14 further comprising four wheels.

17. The push cart system of claim 16, wherein at least two of the four wheels are mounted to the frame so as to enable the wheels to rotate about at least two non-parallel axes.

18. The push cart system of claim 14, further comprising a push member coupled to the frame.

19. The push cart system of claim 14 wherein the push member is integrally formed with the frame.

20. The portable toy of claim 18, wherein the push member is an ergonomically positioned handle.

21. The portable toy of claim 14 wherein the at least one projection includes first and second spaced apart side walls upwardly extending from the base portion, and further comprising a push member connecting the first and second side walls.

* * * * *